Jan. 17, 1933.    H. F. PITCAIRN    1,894,418
AIRCRAFT WITH ROTATIVE SUSTAINING BLADES OR WINGS
Filed June 27, 1931    3 Sheets-Sheet 1

INVENTOR.
Harold F. Pitcairn
BY
Synnestvedt + Lechner
ATTORNEYS.

Jan. 17, 1933.  H. F. PITCAIRN  1,894,418
AIRCRAFT WITH ROTATIVE SUSTAINING BLADES OR WINGS
Filed June 27, 1931   3 Sheets-Sheet 2

INVENTOR.
Harold F. Pitcairn
BY
Symestvedt + Lechner
ATTORNEYS.

Jan. 17, 1933.  H. F. PITCAIRN  1,894,418
AIRCRAFT WITH ROTATIVE SUSTAINING BLADES OR WINGS
Filed June 27, 1931   3 Sheets-Sheet 3
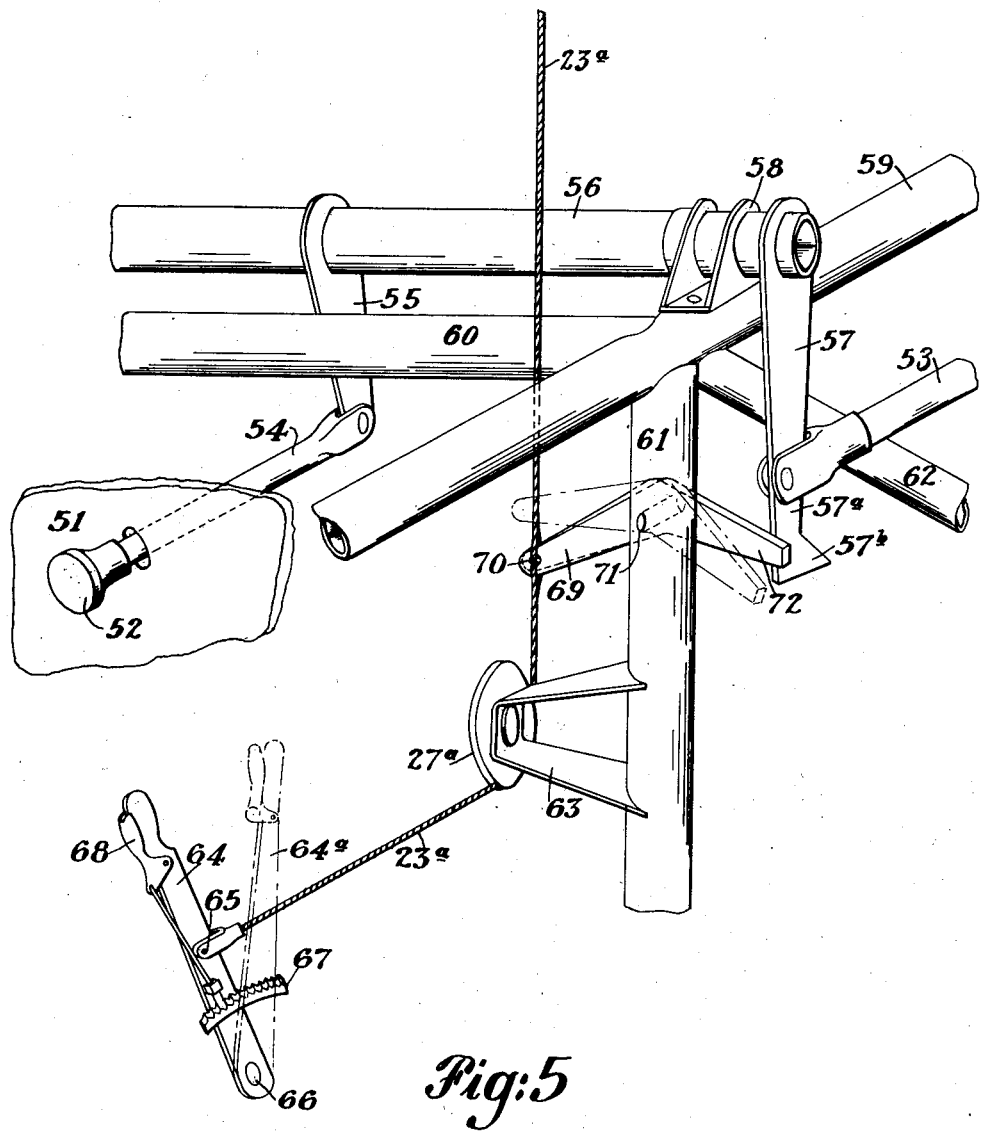
Fig:5
INVENTOR.
Harold F. Pitcairn
BY
Synnestvedt + Lechner
ATTORNEYS.

Patented Jan. 17, 1933

1,894,418

UNITED STATES PATENT OFFICE

HAROLD F. PITCAIRN, OF BRYN ATHYN, PENNSYLVANIA, ASSIGNOR TO AUTOGIRO COMPANY OF AMERICA, OF PHILADELPHIA, PENNSYLVANIA, A CORPORATION OF DELAWARE

AIRCRAFT WITH ROTATIVE SUSTAINING BLADES OR WINGS

Application filed June 27, 1931. Serial No. 547,203.

This invention relates to aircraft with rotative sustaining means and is especially useful in the type of aircraft having a flexibly arranged rotary sustaining blade system which is adapted to be actuated by relative airflow in normal flight, or in vertical descent.

In such aircraft, as is exemplified in patent to Juan de la Cierva, No. 1,590,497, issued June 29, 1926, the rotative sustaining blades or wings are flexibly arranged for rotation about a common axis and for individual displacement movements with respect to said axis, under the action of relative airflow and other forces in flight. According to a further development of such aircraft, a suitable means or mechanism is provided for applying a rotative effort to the rotor, an improved form of which is disclosed and claimed in the co-pending application of Joseph S. Pecker, No. 512,383, filed January 30, 1931; and means for otherwise affecting the operation of the rotor have been developed, for example, means for slowing up or braking the action of the rotor, upon landing, or to hold the rotor stationary when the craft is standing on the ground in a breeze. Such braking mechanism, in combination also with means for affecting the operation of the rotor by starting the same under the action of the slip stream of the normal propelling means, together with means providing for yielding of the rotor blades and cushioning thereof under the action of braking and starting mechanism, is disclosed and claimed in the co-pending application of Juan de le Cierva, Serial No. 496,872, filed Nov. 20, 1930.

In addition to various means, of which several are mentioned above, for affecting rotor operation, this type of craft embodies a full complement of control elements usual to the ordinary airplane, such as the throttle and ignition controls for the engine, the wheel brake controls, and the rudder, elevator, and aileron controls.

It is an important object of the present invention to minimize the number of controls to be operated, in this type of craft, and to minimize the number of operating movements required to manipulate the controls, while yet taking advantage of the various improvements which have been devised. This object is particularly desirable, since, with an aircraft of this type (which is capable of slow flight and vertical descent, and which, due to its inherent characteristics of stability, control, balance, and maneuverability, is basically capable of proper operation with less skill and with less dependency upon the judgment of the pilot), it is desirable that the inherent advantages of the craft be not overbalanced by any possible disadvantages in multiplication of the controls. In short, it is an object of the invention to maintain, in a craft especially intended to be safe and easy to operate, the utmost safety and simplicity of controls for those elements, such as the sustaining rotor, which are peculiar to this type of craft.

More specifically, I aim to combine, coordinate, interlock, or interrelate the movement, control, or operation of various means or mechanisms used to affect or effect the proper operation of the sustaining blade mechanism; and further, where desired, as for instance in connection with the rotor starting mechanism and rotor braking mechanism, to so coordinate or combine the controls or operating members therefor, that when one is used another will be rendered substantially inoperative or incapable of being operated.

I may accomplish the primary objects of the invention by unifying the rotor controlling mechanisms into substantially a single controlling or operating element, or I may accomplish the desired purposes by providing separate control members or operating elements with suitable means for interrelating them or rendering them interdependent such as mechanical interlocking means.

The invention is especially useful in connection with the coordination of the brake and starter mechanism for the rotor, since, if the starter clutch or other starter operating mechanism were to be engaged while the rotor brake was on, excessive loads and possible damage would result. Furthermore, if the starter and brake employed be such that the rotor could be brought up to approximately flight or take-off speed, by the starter, with the brake on, and then if the starter were to be declutched for take-off, the brake might cause the rotor to slow down so rapidly that there would be danger of an accident, especially in operation by a novice, in attempting to take-off.

I further contemplate, in a construction where the controls for two devices, such as the rotor starter and rotor brake, are brought under the operation of a single control or lever, arranging the mechanism in such manner that in cutting out or disengaging the starter the control element cannot accidentally be moved directly into the braking position. Additionally, I preferably arrange the control device, where I unify the controls, in such manner that the said device is movable in two directions, and I so orientate such directions with respect to the position of the pilot that the control device is moved generally forwardly in preparing for a take-off, for example, in starting the motor, and is moved generally rearwardly after making a landing, for example, in applying the rotor brake. This not only renders the apparatus such as to conform with instinctive tendencies of the operator, but also makes it possible to obtain a considerable pull on the brake mechanism with comparatively little effort, since the operator normally has his feet positioned upon the rudder bar or pedals and would naturally push against the latter as he pulled on the rotor brake lever.

How I attain the foregoing objects and advantages and others which are incident to the invention or which will likely occur to those who are skilled in this art, will be evident from the following description, taken together with the accompanying drawings, in which drawings—

Fig. 5 is a somewhat diagrammatic perspective view of the control or operating mechanism of a modified construction.

Figure 1:
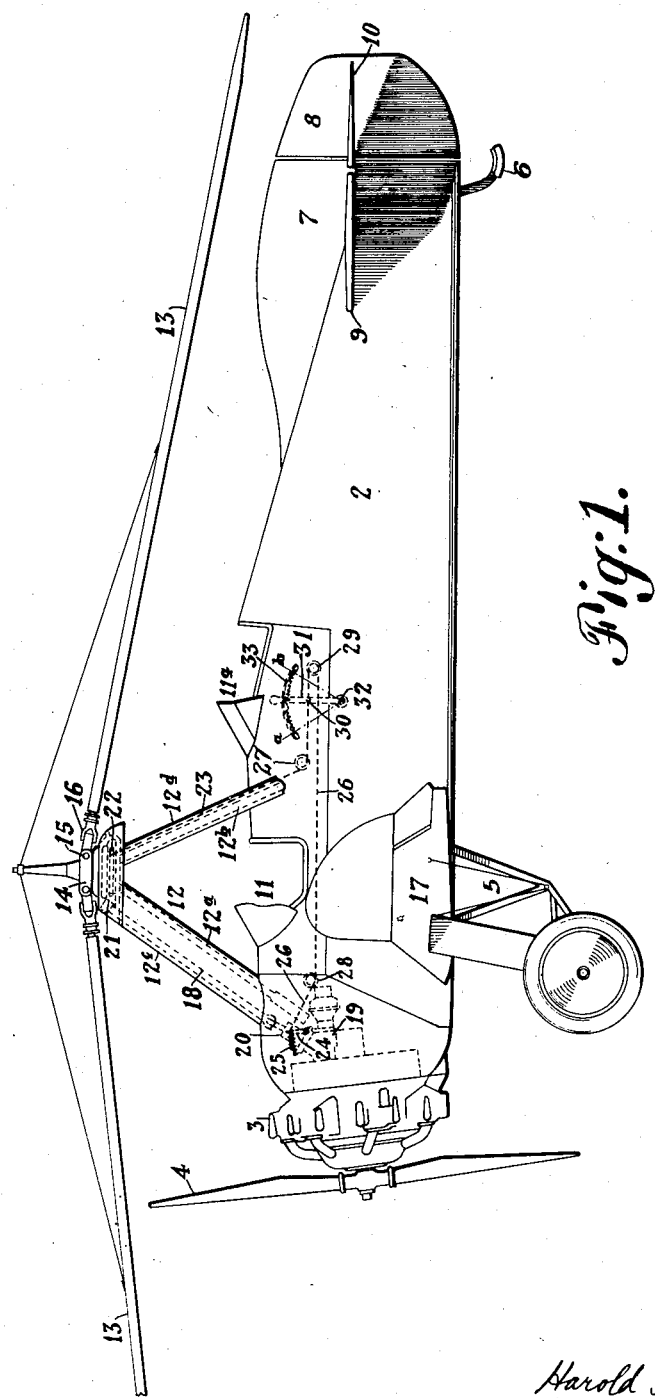
Figure 1 is a side elevational view of an aircraft of the rotative sustaining blade type, indicating, in general, the application of the present invention thereto.

By reference first to Fig. 1, it will be seen that the aircraft is of a rotative-bladed type, in general now known, comprising a fuselage or body 2, engine and propellor 3, 4, alighting mechanism indicated generally at 5, 6, fixed and controllable vertical surfaces 7, 8, fixed and controllable horizontally disposed surfaces 9, 10, forward and rear cockpits 11, and 11a, and a rotor mounting pylon 12, on which the rotor blades or wings 13 are mounted, for rotational and individual swinging movements under the action of relative air flow, as by means of a rotative hub or axis structure 14 and horizontal and vertical pivot pins 15 and 16. Small supplemental fixed wings 17 may also be provided, for various purposes such as disclosed and claimed in the copending applications of Juan de la Cierva, Serial No. 414,901, filed Dec. 18, 1929, and 500,064, filed Dec. 4, 1930.

Adjacent the front leg 12a of the pylon 12 is located the rotor starter drive shaft 18, which may be faired with the front leg, as by means of a suitable stream-line fairing 12c. Such starter mechanism, in accordance with the disclosure of the aforementioned copending application No. 512,383, includes suitable gearing housed at 19, through which gearing and the manually engageable clutch indicated at 20, the drive shaft 18 may be driven from the engine 3. The shaft 18, in turn, transmits its driving torque or effort to the rotor, that is, to the rotor axis 14, by means of suitable gearing indicated generally at 21.

In accordance with the disclosure of the copending application of Joseph S. Pecker, Serial No. 545,451, filed June 19, 1931, rotor brake mechanism, indicated generally at 22, may be mounted within a part of the axis structure of the rotor, and a control element or cable 23 may extend downwardly along one of the rear legs 12b of the pylon, and may be faired therewith, as indicated at 12d. Suitable brake releasing mechanism is normally included in the brake structure itself, in accordance with the disclosure of the last-mentioned application.

For operation of the rotor starter clutch, a lever 24 is provided, which is urged toward release position as by a spring 25. The starter clutch may be engaged by a suitable element such as a cable 26 connected to the lever 24.

In place of totally independent controls for these devices which act upon the rotor, I provide a combining or inter-relating mechanism which may take a very simple form. In this instance I pass the brake operating cable 23 over a pulley or wheel 27 and I pass the starter clutch operating cable 26 over the pulleys or wheels 28 and 29. The two cables are brought together in opposite directions and attached at the point 30 to the common control lever 31, which is pivoted at its lower end on a suitable shaft or pin 32. In its mid position, the lever 31 leaves the starter and the rotor brake in their off or disengaged positions. Moved forwardly toward the position $a$ the lever 31, through the connections shown, operates the rotor starter, and moved rearwardly toward the position $b$ it operates the rotor brake. A suitable notched quadrant 33 is provided for the lever. It will be seen that I obtain very light weight by the use of a common control element and tension actuating means to both the starter and the brake.

Figure 3:
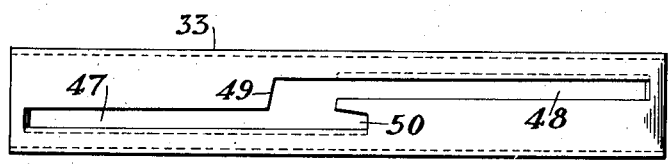
Fig. 3 is a top plan view of a quadrant device shown in Fig. 2.
Figures 2, 4:
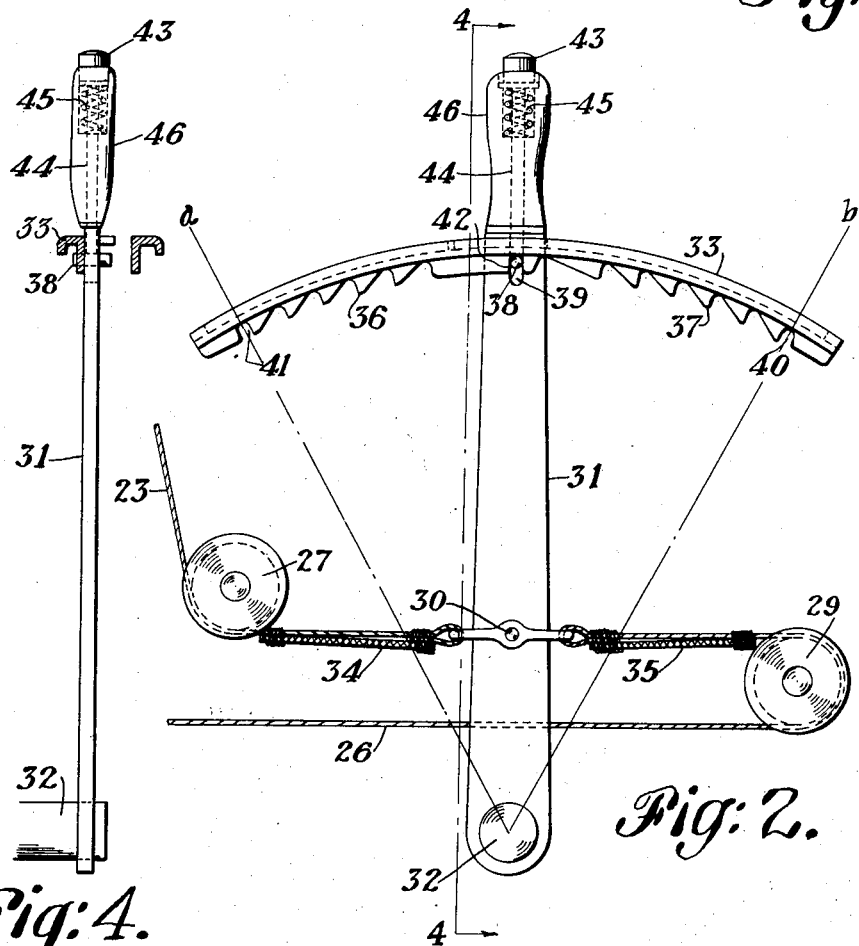
Fig. 2 is an enlarged side elevational detail of that part of the mechanism which is located in the pilot's cockpit of the craft shown in Fig. 1.
Fig. 4 is a view partly in elevation and partly in section taken approximately on the line 4—4 of Fig. 2.

The details of the foregoing mechanism will be understood more clearly by inspection of Figs. 2 to 4. In these figures it will be seen that when the lever 31 is moved to starter engaging position indicated at $a$, any excess slack in the brake operating cable will be taken up by the elastic loop 34, and when the lever is moved to the brake engaging position indicated at $b$, any slack thus produced in the clutch operating cable will be taken up by the elastic loop 35. It will be readily understood that any other suitable arrangement may be provided to prevent the cable which is not at the moment being pulled from becoming too slack, or from being displaced from the pulleys.

On the starter side the quadrant teeth 36 may be directed in the direction of movement for engaging the starter, and on the brake side the teeth 37 may be given an opposite direction or slope, so that the latch 38, mounted to move up and down in the slot 39 and the lever 31, may freely slide over the teeth of the quadrant when moving the lever to operate either the starter or the brake. To release the lever, either from the positive end stops or notches 40, 41, or from the neutral notch 42, or from any intermediate position, the latch 38 may be moved downwardly, by means of the button 43 and rod 44 against the pressure of the spring 45 which is housed in the grip member 46 of the lever. Quick operation, positive hold in any position, and ready and convenient release from any position, are thus obtainable, with a simple manipulation of a common control and with absolute certainty of proper coordination of the two mechanisms under the control.

In addition to the foregoing, however, I render doubly secure the safety and reliability of the device by offsetting the starter slot 47 and the brake slot 48 in the quadrant 33, as best seen in Fig. 3. Thus a quick release of the brake brings the lever 31 against the fixed abutment 49, at neutral position, and a quick release of the starter brings the lever 31 into the slot extension 50. Since it is particularly important that, in take-off, the lever be not moved from starter engaged position into braking position, I so position the lever 31 axially of its fulcrum pin or shaft 32 that it normally lies in the plane of the slotting 47, 50, so that, to operate the brake, it is necessary to deflect the lever 31 laterally, against its natural resilience, into the brake slot 48. The whole device is thus not only very simple and easy to operate but safe almost to the point of being fool-proof.

In the modification of Fig. 5, which is readily adaptable to existing rotor control devices, I may interlock the separate starter and brake control mechanisms by the mere introduction of a couple of simple elements. In this construction, there extends through the panel 51 of the cockpit a clutch control handle or knob 52, a pull upon which imparts the necessary pull upon the clutch operating member or rod 53, as by means of rod 54, arm or lever 55, rock shaft 56 and arm or lever 57. The shaft 56 may be suitably journaled in brackets 58 mounted on a fuselage frame member such as a longeron 59, preferably adjacent the juncture of the longeron with fuselage bracing elements 60, 61 and 62. On the vertical fuselage frame element 61 is mounted a pulley or wheel 27$a$, as by means of a bracket 63, and the brake operating cable 23$a$ passes over this pulley and upwardly to the brake, the brake control being in the form of a lever 64 pivotally connected at 65 to the cable 23$a$ and fulcrumed at 66 to any fixed part of the machine. A suitable locking quadrant 67 and releasable latch 68 are also provided.

In accordance with the present invention, I interpose in the brake cable 23$a$ a rockable lock or lever member 69 which has one end connected into the cable at 70 and which is pivotally mounted at 71 on the fuselage member 61. The other end or arm 72 of the lever 69 forms a safety catch or interlock with the lower extension 57$a$ of the clutch operating member 57.

As seen in full lines in Fig. 5, the brake lever is pulled back into its operating position, thus throwing the locking arm 72 in the way of starter clutch arm extension 57$a$, and positively preventing the pulling of the clutch control handle outwardly to engage the starter clutch. If, on the other hand, the brake is in released position, as indicated in dotted lines at 64$a$, and the rotor starter is engaged, the lower end or foot 57$b$ of the starter lever 57 is positioned above the end of lever arm 72 of the brake mechanism, and any attempt to apply the rotor brake will be effectually stopped by contact of lever arm 72 against the bottom of the foot 57$b$.

From the foregoing it will be evident that the present invention is readily applicable to existing or new equipment, provides a proper cooperative relation between the different rotor operating elements, admits of application either to one or a plurality of actual control members, and in general, accomplishes the objects and advantages hereinbefore set forth.

What I claim is:—

1. In an aircraft, a sustaining rotor, rotor starter mechanism and rotor braking mechanism, movable means for controlling said mechanisms, and retaining means for holding said movable means in various control positions, said movable means and said retaining means having co-operating parts so arranged that movement to an operating position is unimpeded and is maintained by said retaining means against movement away from said operating position.

2. In an aircraft, a sustaining rotor, rotor starter mechanism and rotor braking mechanism, movable means for controlling said mechanisms, and retaining means for holding said movable means in various control positions, said movable means and said retaining means having co-operating parts so arranged that movement to an operating position is unimpeded and is maintained by said retaining means against movement away from said operating position, together with release means for disengaging the co-operating parts whereby the movable means may be moved out of an operating position.

3. In an aircraft, a sustaining rotor, a rotor starter device, a rotor brake device, means for actuating the rotor starter, means for actuating the rotor brake, and means for preventing actuation of one device when the other is being actuated, said last means including a common control element for the two actuating means having a neutral position, said element being movable from neutral position in two directions and adapted to insure release of one device when actuating the other, together with yielding means for taking up lost motion in one actuating means when the other is being actuated.

4. In an aircraft, a sustaining rotor, a rotor starter device, a rotor brake device, means for actuating the rotor starter, means for actuating the rotor brake, and means for preventing actuation of one device when the other is being actuated, said last means including a common control element for the two actuating means, said element being movable in two directions and connected with the actuating means in such manner that a given movement in one direction actuates the starter and a given movement in the opposite direction actuates the brake, together with stop means preventing unintentional brake engagement upon starter releasing movement.

5. In an aircraft, a sustaining rotor, a rotor starter device, a rotor brake device, means for actuating the rotor starter, means for actuating the rotor brake, and means for preventing actuation of one device when the other is being actuated, said last means including a common control element for the two actuating means, said element being movable in two directions and connected with the actuating means in such manner that a given movement in one direction actuates the starter and a given movement in the opposite direction actuates the brake, together with stop means preventing unintentional brake engagement upon starter releasing movement, said element being deflectable to pass said stop means.

6. In an aircraft, a sustaining rotor, a driving device therefor, a braking device for the rotor, a control element, a tension operating member between the driving device and said element, and a tension operating member between the braking device and said element.

7. In an aircraft, a sustaining rotor, a driving device for the rotor, a braking device for the rotor, a common control element for said devices having a neutral position and being movable in each of two opposite directions from said neutral position to provide for alternative actuation of the driving device and the braking device, operating connections extended from the control element to said devices, the operating connection extended to one of said devices including a tension member, and yielding means for taking up lost motion in said tension member when the control element is operated to actuate the device associated with the other operating connection.

8. In an aircraft, a sustaining rotor, a driving device therefor, a braking device for the rotor, a control element, a tension operating member between the driving device and said element, and a tension operating member between the braking device and said element, together with yielding means for taking up slack in each of said tension operating members when the control element is operated to actuate the device associated with the other tension member.

9. In an aircraft, a sustaining rotor, a rotor starter device, a rotor brake device, a common control element for said devices having a neutral position and being movable from said neutral position in each of two opposite directions to provide for alternative actuation of the starter device and the brake device, operating connections extended between said element and said devices, a quadrant associated with said element and having oppositely presented abutment means at the two sides of the neutral position, and a releasable stop associated with said element and said quadrant, the stop and said abutment means being constructed to permit normally unimpeded movement of the control element either to brake applying or to starter applying positions and cooperating with each other to maintain the desired brake or starter applying position.

10. In an aircraft, a sustaining rotor, a starter device for the rotor, a braking device for the rotor, a common control element for said devices having a neutral position and being movable from said neutral position in each of two generally opposite directions, operating connections extended between said element and said braking device providing for actuation thereof upon movement of the element in one direction, operating connections extended between said element and said starter device providing for actuation thereof upon movement of the element in the opposite direction, and stop means disposed in the path of movement of said element from one of its operating positions to neutral position and arranged to prevent unintentional movement of said element beyond neutral position upon release actuation thereof.

11. In an aircraft, means of forward propulsion, a sustaining rotor normally actuated in flight by the relative air-flow produced by translational movement of the craft, a rotor starter device for initiating rotation of the rotor prior to take-off, a rotor brake device for stopping or preventing rotation of the rotor when on the ground, interrelated means movable for actuating the rotor starter device and for actuating the rotor brake device, means for preventing actuation of one device when the other is being actuated, and means preventing unintentional brake engagement upon starter releasing movement when taking off.

12. In an aircraft, a sustaining rotor normally actuated by relative air-flow in flight, a starting device for the rotor, a braking device for the rotor, interlocked control means for said devices including a tension operating member between the starting device and the control means and a tension operating member between the braking device and the control means, and means for preventing excessive slackening of one of said tension devices when the other is being actuated.

In testimony whereof I have hereunto signed my name.

HAROLD F. PITCAIRN.